June 8, 1965 K. J. TONKIN 3,187,864
ONE-WAY OVERRUNNING CLUTCH
Filed Nov. 2, 1962

INVENTOR.
KENNETH J. TONKIN
BY
Ooms, McDougall & Hersh.
ATTY'S.

3,187,864
ONE-WAY OVERRUNNING CLUTCH
Kenneth J. Tonkin, Glenview, Ill., assignor to A. B. Dick Company, Chicago, Ill., a corporation of Illinois
Filed Nov. 2, 1962, Ser. No. 234,983
1 Claim. (Cl. 192—46)

This invention relates to clutches of the one-way overrunning type, such as the clutches which are often used to drive certain of the rollers or cylinders of printing machines. It will be understood, however, that the present invention is applicable generally to overrunning clutches for driving rotary members of various kinds.

Most overrunning clutches are of two types, the ratchet type and the wedging type. The ratchet type of clutch involves a ratchet wheel on either the driven or the driving member, and a pawl on the other member. This type of clutch has the advantage of providing a positive nonslipping drive between the two members, but has the disadvantage that there are only a definite number of relative positions in which the driving connection can be established. These positions correspond to the ratchet teeth and are spaced by the pitch of the ratchet teeth. Thus, it is possible that the driving member will have to rotate through an angle only slightly less than the pitch of the ratchet teeth before the driving connection is established. If the clutch is being employed to drive the forwarding rollers of a printing press, the movement of the paper may be delayed by an amount corresponding to the pitch of the ratchet teeth. This delay may cause objectionable errors in the registration of the printing applied to the paper.

In a wedging type clutch, the driving connection is established by a roller or ball which is adapted to wedge between a cam surface on the driving member and a differently curved surface on the driven member. In the case of such a clutch, at least in theory, the driving connection may be established for any relative position between the driving and driven members. However, the drive relies on the frictional engagement of the ball or roller with the curved wedging surfaces, so that the drive is impositive and hence may have the tendency to slip at times. The slip may cause some delay in the movement of the driven member, after the driving member has started to rotate. If the driving member is the forwarding roller on a duplicator or printing press, the slippage may cause objectionable errors in the registration of the printing applied to the copy sheets.

One object of the present invention is to provide a new and improved overruning clutch which combines advantages of a ratchet type clutch and a wedging clutch.

A further object is to provide a new and improved overruning clutch which achieves the positive drive characteristic of ratchet clutches, yet with greatly improved precision of control so that loss of forward movement between the driving and driven members is reduced to a negligible minimum.

Another object is to provide a new and improved overrunning clutch of the foregoing character which is so constructed that the effective number of ratchet teeth exceeds the actual number of teeth by a factor of two or more.

A further object is to provide a new and improved overruning clutch having a plurality of pawls which successively engage the corresponding teeth of the ratchet wheel so that the total number of driving positions corresponds to the number of ratchet teeth times the number of pawls.

Further objects and advantages of the present invention will appear from the following description, taken with the accompanying drawings, in which.

The drawings illustrate a one-way overrunning clutch 10 as applied to the mechanism for driving a forwarding roller 12 in a duplicator or printing press. However, it will be realized that the clutch may be employed to drive various rotatable members in many types of machines. The roller 12 may be employed to advance or feed the paper or copy sheets into the printing couple of the duplicator or printing press. Thus, the precision with which the roller 12 is driven affects the registration of the printing matter applied to the copy sheets. The roller 12 may be intermittently rotated in timed relation to the rotation of the cylinders of the printing couple.

The intermittent rotation of the roller 12 may be achieved by means of a gear sector 14 which may be oscillated back and forth by a cam, not shown. The gear sector 14 meshes with a small gear or pinion 16 which is connected to the roller by the one-way overrunning clutch 10. Such mechanisms are well known in the printing art.

Figure 3:
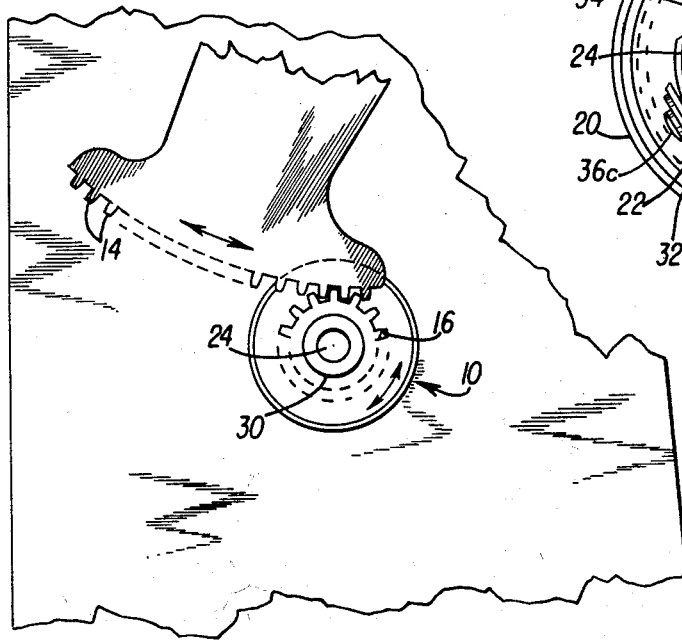
FIG. 3 is a fragmentary elevational view taken generally as indicated by the line 3—3 in FIG. 1.

Thus, when the gear sector 14 moves to the right, as seen in FIG. 3, the pinion 16 is rotated clockwise. This rotation is imparted to the roller 12 by the one-way clutch 10. When the gear sector 14 returns to the left, the pinion 16 is rotated counterclockwise. Because of the one-way operation of the clutch 10, this rotation is not coupled to the roller 12 by the clutch 10. In addition to its one-way driving feature, the clutch 10 has the feature of permitting the roller 12 to rotate ahead of its drive. Thus, the roller 12 is permitted to overrun the pinion 16. Such overruning may occur in a printing press when the printing couple or other rollers pull the copy sheets over the forwarding roller 12 after the driving effort afforded by the gear sector 14 has been completed, or at a rate faster than the drive afforded by the gear sector.

In this case, the gear 16 may be regarded as the driving member, while the roller 12 may be considered the driven member. In the clutch 10, a ratchet wheel 18 is connected to either the driving or the driven member. In this case, the ratchet wheel 18 is connected to the gear 16 which serves as the driving member. The illustrated ratchet wheel 18 is of the internal type, comprising an annular generally cylindrical housing 20 having a large number of equally spaced internal ratchet teeth 22. The gear 16 may be brazed or otherwise rigidly secured to one end of the annular housing 20. The illustrated roller 12 is secured to a shaft 24 which extends into the internal ratchet wheel 18 and is disposed coaxially relative thereto. The shaft 24 may be rotatably supported by a bearing 26 mounted on a frame plate or other member 28. The gear 16 and the ratchet wheel 18 may be rotatably supported on the end of the shaft 24. A bushing or bearing 30 may be mounted in the gear to receive the end of the shaft.

The ratchet wheel 18 is engaged by a plurality of ratchet pawls which are mounted on a hub 34 secured to the roller shaft 24. In this case, there are three of the pawls, 32a, 32b and 32c, but the number of pawls could be two, four or any desired larger number. The illustrated pawls are mounted on radially directed posts 36a, 36b and 36c projecting from the hub. A retaining ring 38 may be mounted on each post to retain the corresponding pawl on the post. Sufficient clearance may be provided between each pawl and the corresponding post to permit the pawl to rock or swing on the post, so that the pawl may ratchet over the teeth 22 of the ratchet wheel. In this case, each of the pawls 32a, -b and -c is in the form of a thin blade which is apertured for mounting on the corresponding post. Each of the pawls may be provided with a spring 40 for biasing the pawl outwardly against the ratchet wheel 18. The spring 40 is adapted to yield to permit the pawl to snap over each of the ratchet teeth 22.

The housing 20 is retained on the hub 34 by a washer 42, which is secured within the end of the housing by a retaining ring 44. These parts have been omitted from FIG. 2 for clarity of illustration.

In the clutch of the present invention, the ratchet teeth 22 and the pawls 32a, -b and -c are so positioned relative to one another that the pawls successively engage the corresponding ratchet teeth. Only one of the pawls engages the corresponding ratchet tooth at any one time. The effect of this arrangement is to triple the number of relative positions in which a positive driving connection can be established between the ratchet wheel and the hub 34. Thus, such a large number of driving positions may be provided that the lost motion between the driving and driven members may be reduced to an inconsequential minimum.

Figure 1:
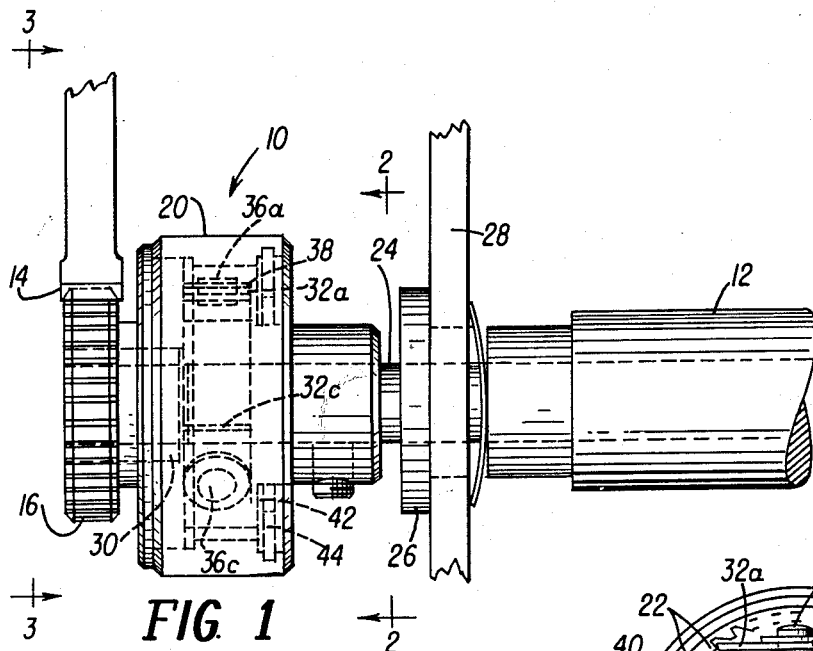
FIG. 1 is a somewhat diagrammatic elevational view showing a one-way overruning clutch to be described as an illustrative embodiment of the present invention.
Figure 2:
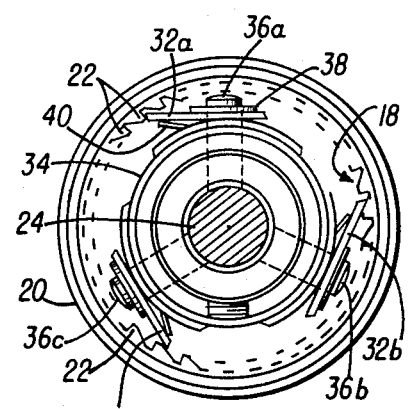
FIG. 2 is an elevational view, partly in section, along a line 2—2 in FIG. 1, with certain parts removed for clarity of illustration.

In the position of the clutch shown in FIG. 2, the pawl 32a is in full driving engagement with the corresponding ratchet tooth. It will be seen that the pawl 32c is spaced from full driving engagement by one-third of the pitch of the ratchet teeth. The pawl 32b is spaced from full driving engagement by two-thirds of the pitch of the ratchet teeth. Thus, if the ratchet wheel 18 overruns the hub 34 in a counterclockwise direction, the pawl 32c will come into driving engagement with its ratchet tooth after an overrunning movement of one-third of the pitch of the ratchet teeth. The pawl 32b will come into full driving engagement with its tooth after a total overrunning movement of two-thirds of the pitch.

This operation may be achieved by providing unequal angular intervals between the pawls 32a, -b and -c. If the three illustrated pawls were equally spaced, they would be spaced at angular intervals of 120°. However, the illustrated pawls are displaced from such equal angular intervals by progressively larger fractions of the pitch of the ratchet teeth. Thus, for example, the ratchet wheel 18 may have 48 teeth, in which case the pitch of the teeth is 7.5°. The spacing between the pawls 32a and 32b may be 120° plus 2.5°, making a total spacing of 122.5°. The 2.5° deviation from equal spacing corresponds to one-third of the pitch of the ratchet teeth.

For equal angular spacing, the total clockwise angle between the pawls 32a and pawl 32c would be 240°. However, in the illustrated construction, this angle is 245°. The total deviation of 5° corresponds to two-thirds of the pitch of the ratchet teeth.

With 48 teeth and three ratchet pawls, the lost motion between the ratchet wheel and the roller 12 is never more than 2.5°, so that any delay in the movement of the paper is negligibly small. The lost motion may be decreased to a still greater extent by increasing the number of ratchet teeth or the number of pawls.

With 48 ratchet teeth and three pawls, the possible lost motion corresponds to a ratchet wheel having 144 teeth with a single pawl. However, the advantage of small lost motion is achieved without resorting to extremely fine ratchet teeth, which provide a less positive drive than coarser teeth. Moreover, the present clutch with its relatively coarse teeth is much more resistant to wear than a clutch with extremely fine teeth.

As an alternative to the unequal spacing of the pawls, the number of ratchet teeth may be changed so as to be other than an integral multiple of the number of pawls. Thus, for example, the number of ratchet teeth may be changed to 47, for example, or 49 or 50, or any other number which is not an integral multiple of three. The three pawls may then be equally spaced. Only one pawl at a time will be in driving engagement with the ratchet teeth. The total number of positions of driving engagement will correspond to three times the number of ratchet teeth.

It will be evident that the overrunning clutch of the present invention provides a positive ratchet-type drive with extremely small lost motion, equal or superior in this respect to a wedging type clutch. The clutch of the present invention is easy to manufacture, economical, and extremely durable.

Various modifications, alternative constructions and equivalents may be employed without departing from the true spirit and scope of the invention, as exemplified in the foregoing description and defined in the following claim.

I claim:

In a one-way overrunning clutch, the combination comprising a first rotatable member having an internal ratchet wheel thereon with a plurality of ratchet teeth, a second rotatable member coaxial with said first rotatable member and having a hub received within said internal ratchet wheel, said internal ratchet wheel being spaced radially from said hub, a plurality of posts extending radially from said hub toward said internal ratchet wheel but spaced inwardly therefrom, a plurality of pawls mounted on said posts and engageable with said ratchet teeth on said internal ratchet wheel to form driving connections between said first and second rotatable members, each of said pawls being in the form of a flat blade having one end portion rockably mounted on the corresponding post and the other end portion engageable with said ratchet wheel, each of said posts extending substantially in a radial direction and perpendicular to the axis of said second rotatable member, each of said pawls being substantially perpendicular to the corresponding post and being in a substantially tangential relation to said hub, and a flat leaf spring mounted on each of said posts between said hub and the corresponding pawl and biasing said pawl outwardly toward said internal ratchet wheel.

References Cited by the Examiner

UNITED STATES PATENTS

| | | | |
|---|---|---|---|
| 1,531,825 | 3/25 | Webb | 192—46 |
| 1,615,534 | 1/27 | Cassel | 192—46 |
| 2,400,818 | 5/46 | Gallagher | 192—46 |
| 2,591,993 | 4/52 | Aijola | 74—577 |
| 2,705,428 | 4/55 | McCullough | 74—577 |
| 2,818,950 | 1/58 | Harless | 192—46 |

DAVID J. WILLIAMOWSKY, Primary Examiner.